(12) United States Patent
Yang et al.

(10) Patent No.: US 7,855,952 B2
(45) Date of Patent: Dec. 21, 2010

(54) SILENT FAILURE IDENTIFICATION AND TROUBLE DIAGNOSIS

(75) Inventors: Chen-Yui Yang, Marlboro, NJ (US);
Mark Hunt, Plano, TX (US); Michael Lambert, Springtown, TX (US);
Wen-Jui Li, Bridgewater, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 89 days.

(21) Appl. No.: 12/274,737

(22) Filed: Nov. 20, 2008

(65) Prior Publication Data

US 2010/0124165 A1    May 20, 2010

(51) Int. Cl.
*H04J 3/14* (2006.01)
*H04L 12/26* (2006.01)
*G06F 15/173* (2006.01)

(52) U.S. Cl. .................. 370/218; 370/242; 370/250; 709/224

(58) Field of Classification Search ............... None
See application file for complete search history.

(56) References Cited

U.S. PATENT DOCUMENTS

| | | | |
|---|---|---|---|
| 2002/0143494 A1* | 10/2002 | Conrad | 702/176 |
| 2004/0098223 A1* | 5/2004 | Conrad | 702/176 |
| 2006/0047807 A1* | 3/2006 | Magnaghi et al. | 709/224 |
| 2006/0159017 A1* | 7/2006 | Mun et al. | 370/230 |
| 2006/0168271 A1* | 7/2006 | Pabari et al. | 709/230 |
| 2006/0277299 A1* | 12/2006 | Baekelmans et al. | 709/224 |
| 2007/0036544 A1* | 2/2007 | Fukashiro et al. | 398/19 |
| 2007/0168505 A1* | 7/2007 | Devadoss et al. | 709/224 |
| 2008/0069002 A1* | 3/2008 | Savoor et al. | 370/241 |
| 2008/0181100 A1* | 7/2008 | Yang et al. | 370/216 |
| 2008/0281607 A1* | 11/2008 | Sajja et al. | 705/1 |

* cited by examiner

*Primary Examiner*—Chi H Pham
*Assistant Examiner*—Soon-Dong D Hyun
(74) *Attorney, Agent, or Firm*—Hope Baldauff Hartman, LLC

(57) ABSTRACT

According to one method for identifying and resolving a silent failure in a telecommunications network, performance data associated with data traffic passing through a network element in the telecommunications network is collected. A determination is made whether the performance data has fallen below a threshold to identify the silent failure at the network element. The silent failure fails to trigger an alarm included on the network element. Responsive to determining that the performance data is below the threshold and thereby identifying the silent failure at the network element, troubleshooting rules may be retrieved. The silent failure is resolved based on the performance data and the troubleshooting rules.

17 Claims, 3 Drawing Sheets

SILENT FAILURE IDENTIFICATION AND TROUBLE DIAGNOSIS

BACKGROUND

Exemplary embodiments relate generally to the field of telecommunications networks, and more specifically, to identifying silent failures in telecommunications networks and diagnosing troubles that caused the silent failures.

A telecommunications network generally includes multiple network elements, such as switches and routers, functionally coupled via a suitable communications network. The network elements are typically manufactured with alarms to indicate that a portion of the network element has failed. For example, routers commonly include alarms for detecting port failures and card failures. These alarms enable maintenance personnel and/or automated maintenance systems to easily determine the source of a failure and to efficiently resolve the failure.

Alarms are generally limited to identifying those failures that the manufacturer chooses. In many cases, alarms are only included for fatal errors that result in the complete failure of a network element. Any failures at the network elements that do not result in an alarm are commonly referred to as "silent failures." Silent failures can result in a number of problems that adversely affects customer traffic, such as packet loss or a reduction of two-way traffic into one-way traffic. Since silent failures by definition do not generate alarms, silent failures are conventionally detected by customers who manually monitor their own network performance. This is especially problematic during off-hours when the customer may not be actively monitoring network performance. For example, a silent failure may occur at a business on late Friday afternoon and not be discovered by the customer until Monday morning, thereby allowing the network problems to endure through the entire weekend at the business's detriment.

When a customer detects a decrease in network performance (e.g., a reduction in data transmission rates), the customer typically contacts its corresponding service provider. The service provider may then manually deploy personnel to perform a variety of diagnostic tests in order to discover the cause of the decrease in network performance. In many cases, until these tests are completed, the service provider is unaware whether the decrease in network performance is caused by a silent failure (i.e., a failure at the service provider's network elements) or by actions on the customer's side. Performing these tests are generally time consuming and can lead to significant downtime for the customer.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the disclosure presented herein include methods, systems, and computer-readable media for identifying and resolving a silent failure in a telecommunications network. According to one aspect, a method for identifying and resolving a silent failure in a telecommunications network is provided. According to the method, performance data associated with data traffic passing through a network element in the telecommunications network is collected. A determination is made whether the performance data has fallen below a threshold to identify the silent failure at the network element. The silent failure fails to trigger an alarm included on the network element. Responsive to determining that the performance data is below the threshold and thereby identifying the silent failure at the network element, troubleshooting rules may be retrieved. The silent failure is resolved based on the performance data and the troubleshooting rules.

According to another aspect, a system for identifying and resolving a silent failure in a telecommunications network is provided. The system includes a memory and a processor functionally coupled to the memory. The memory stores a program containing code for identifying and resolving the silent failure in the telecommunications network. The processor is responsive to computer-executable instructions contained in the program and operative to collect performance data associated with data traffic passing through a network element in the telecommunications network, determine whether the performance data has fallen below a threshold to identify the silent failure at the network element, responsive to determining that the performance data is below the threshold and thereby identifying the silent failure at the network element, retrieve troubleshooting rules, and resolving the silent failure based on the performance data and the troubleshooting rules. The silent failure fails to trigger an alarm included on the network element.

According to yet another aspect, a computer-readable medium having instructions stored thereon for execution by a processor to perform a method for identifying and resolving a silent failure in a telecommunications network is provided. According to the method, performance data associated with data traffic passing through a network element in the telecommunications network is collected. A determination is made whether the performance data has fallen below a threshold to identify the silent failure at the network element. The silent failure fails to trigger an alarm included on the network element. Responsive to determining that the performance data is below the threshold and thereby identifying the silent failure at the network element, troubleshooting rules may be retrieved. The silent failure is resolved based on the performance data and the troubleshooting rules.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to identifying and resolving silent failures in a telecommunications network. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
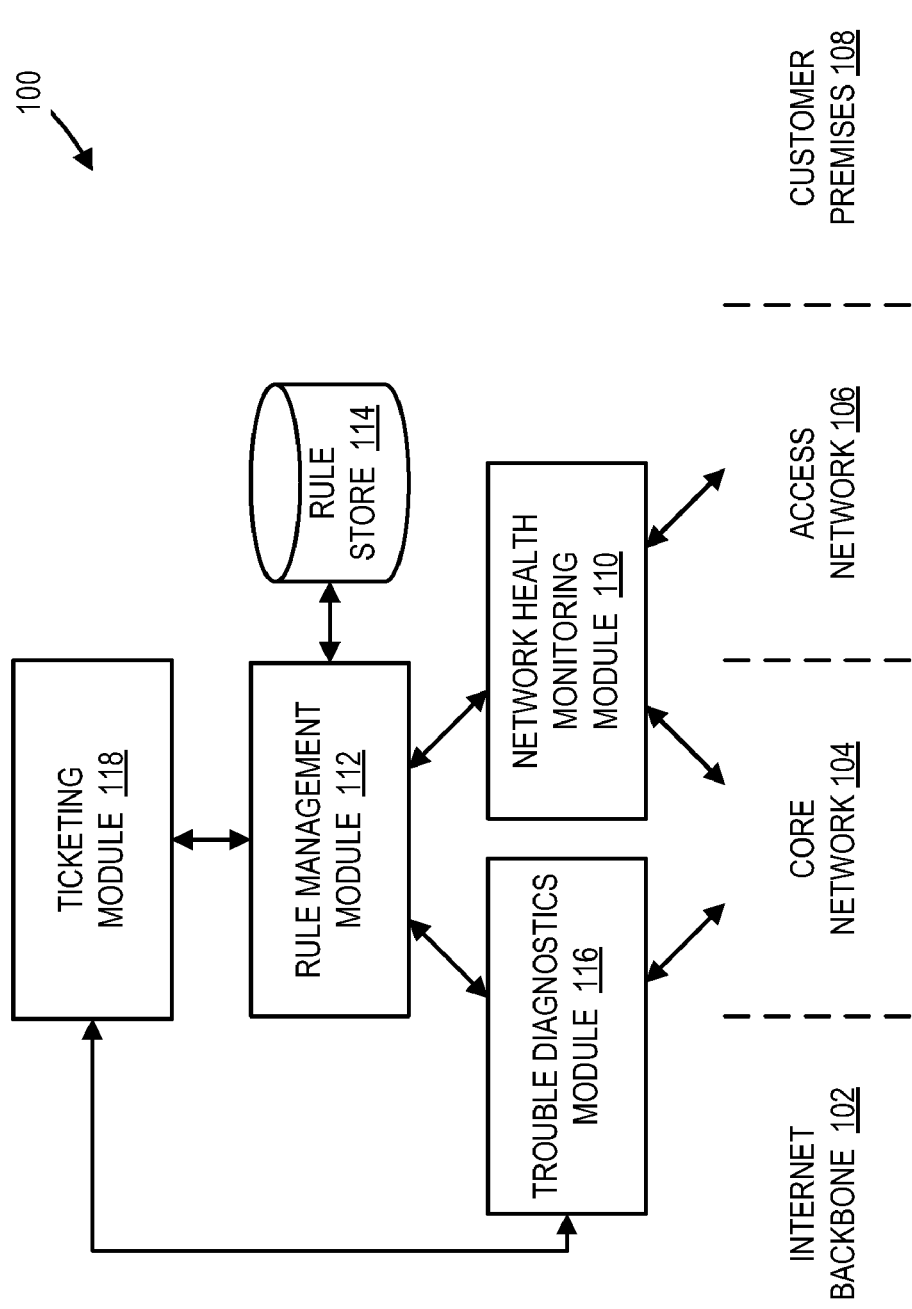
FIG. 1 is a diagram illustrating a network architecture operative to identify and resolve a silent failure in a telecommunications network, in accordance with exemplary embodiments.

In the following detailed description, references are made to the accompanying drawings that form a part hereof, and which are shown by way of illustration, using specific embodiments or examples. Referring now to the drawings, in which like numerals represent like elements through the several figures, aspects of a computing system and methodology for detecting silent failures in a telecommunications network will be described. FIG. 1 shows an illustrative telecommunications network architecture 100 according to exemplary embodiments. The architecture 100 includes an Internet backbone 102, a core network 104, an access network 106, and a customer premises 108. The customer premises 108 may include a variety of customer devices (that may be used by users other than the customers), such as telephones and computers. In one embodiment, these customer devices are functionally coupled to the access network 106 via a router (not shown). In particular, the access network 106, which may be operated by a service provider, may include a Digital Subscriber Line Access Multiplexer ("DSLAM") (not shown) functionally coupled to the router via a local loop. The DSLAM functionally couples the access network 106 to the core network 104, which provides a variety of services to customers connected to the access network 106. Further, the core network 104 provides access to the Internet backbone 102 to enable communications with other private networks and Internet Service Providers ("ISPs"). The Internet backbone 102, the core network 104, the access network 106, and the customer premises 108 are well known to those skilled in the art as common components in telecommunications infrastructures, and as such, are not described in greater detail herein.

The architecture 100 further includes a network health monitoring module 110, a rule management module 112, a rule store 114, a trouble diagnostics module 116, and a ticketing module 118. According to embodiments, the network health monitoring module 110 monitors incoming and outgoing data traffic at the core network 104 and the access network 106 in order to collect current performance data, such as the number of packets being transmitted and/or received within a given interval. The performance data may include any suitable data that indicates the relative performance of the data core network 104 and the access network 106. In one embodiment, the performance data is retrieved from the network elements present in the data core network 104 and the access network 106. The network health monitoring module 110 then compares the current performance data with a given threshold in order to determine whether a change in the performance data has occurred. In particular, a significant and detrimental change in the performance data may be an indication of a silent failure. If the current performance data exceeds or falls below the threshold, the network health monitoring module 110 informs the rule management module 112 that a possible silent failure has been detected. An example threshold may be the number of packets being transmitted within a given time period. Other suitable indicators of network performance may be similarly utilized as contemplated by those skilled in the art.

According to embodiments, the rule management module 112 retrieves troubleshooting rules from the rule store 114 and provides the retrieved troubleshooting rules to the trouble diagnostics module 116, which executes automated diagnostics and recovery procedures in accordance with the troubleshooting rules and the performance data acquired by the network health monitoring module 110. For a silent failure that the trouble diagnostics module 116 cannot resolve under automated procedures, the rule management module 112 may inform the ticketing module 118 to generate a trouble ticket, which is then provided to a service provider (not shown). Responsive to receiving the trouble ticket, the service provider may dispatch maintenance personnel or perform other procedures in order to resolve the silent failure as contemplated by those skilled in the art.

The rule management module 112 may further determine whether the silent failure is due to a switchover by performing a root cause analysis. As used herein, a switchover refers to a "switch over" from a primary device to a standby device when the primary device fails. The switchover may cause a silent failure if the primary device is deactivated while the standby device is not properly activated, resulting in neither the primary device nor the standby device being operative. If the rule management module 112 determines that the silent failure is due to the switchover, the rule management module 112 may inform the ticketing module 118 to generate a trouble ticket.

In conventional practice, service providers typically do not take proactive steps to identify silent failures, relying primarily on alarms that are built into network elements by their manufacturers. In many cases, the service providers do not discover the presence of a silent failure until a customer complains about degradation in their data traffic. This often leads to unhappy and dissatisfied customers. The network health monitoring module 110, the rule management module 112, and the trouble diagnostics module 116 enable service providers to take a proactive approach towards identifying and resolving silent failures. In particular, the network health monitoring module 110, the rule management module 112, and the trouble diagnostics module 116 can identify and resolve silent failures prior to the customer complaining. This is particularly useful if the silent failure occurs, for example, on a late Friday afternoon before the weekend or before an extended holiday break. In these cases, the service provider can begin resolving the silent failure immediately, instead of waiting until the customer complains on the next work day.

Figure 2:
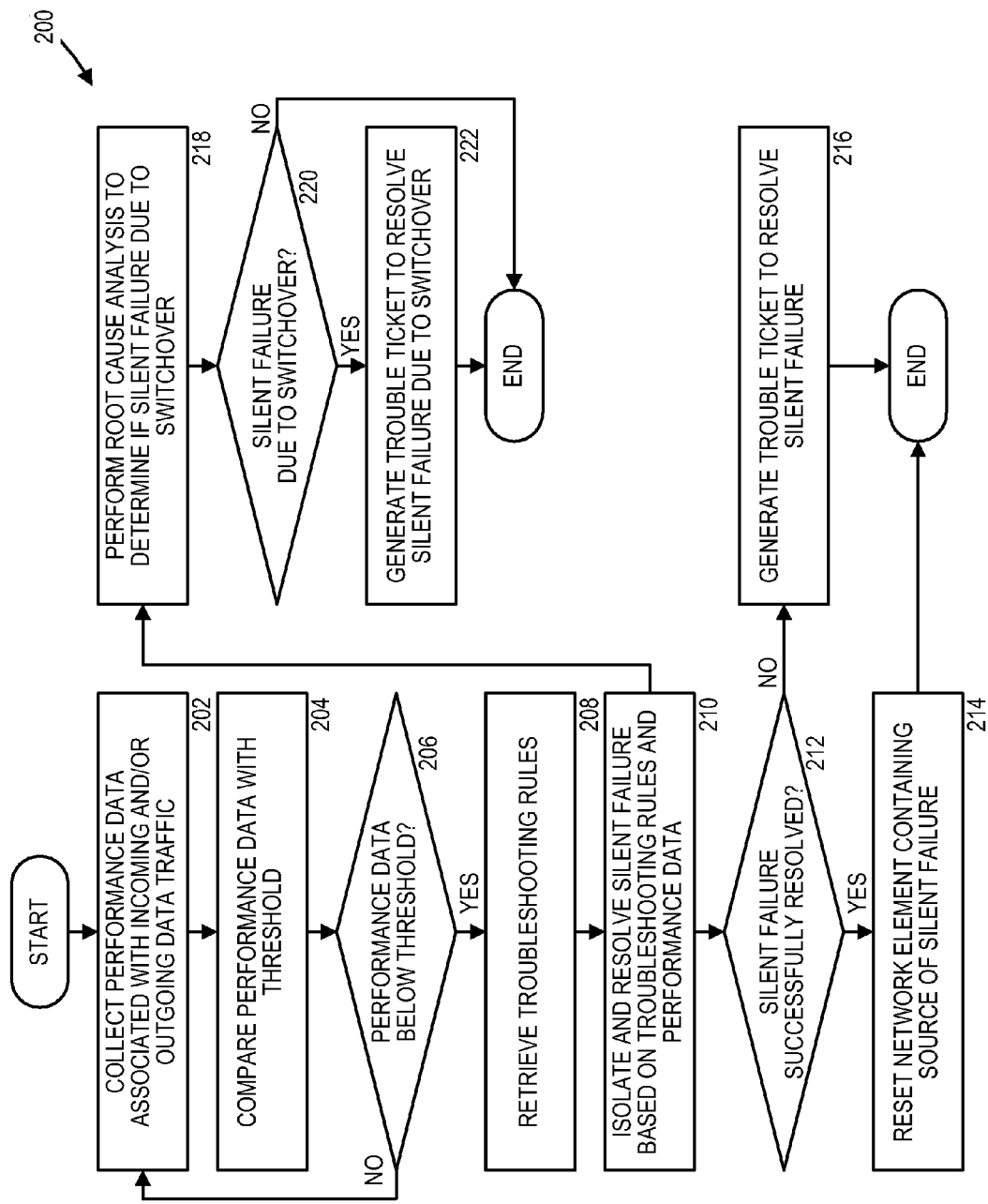
FIG. 2 is a flow diagram illustrating a method for identifying and resolving a silent failure in a telecommunications network, in accordance with exemplary embodiments.

FIG. 2 is a flow diagram illustrating a method 200 for identifying and resolving silent failures in a telecommunications network. According to the method 200, the network health monitoring module 110 collects (at 202) current performance data associated with incoming and/or outgoing traffic from the core network 104 and the access network 106. In particular, the network health monitoring module 110 may collect the current performance data for a given time interval. An example of performance data is the number of packets being transmitted and/or received within the given time interval. In one embodiment, the performance data is obtained directly from the network elements by querying the network elements for the performance data.

Responsive to collecting the current performance data, the network health monitoring module 110 compares (at 204) the current performance data with a given threshold in order to determine whether the data traffic being transmitted and/or received through the core network 104 has degraded to a level that indicates a silent failure. In one embodiment, a difference is determined between the current performance data and previous performance data. The difference is then compared with a minimum value indicating a silent failure. Thus, if the difference is greater than the minimum value, then the current performance data has fallen below the threshold. If the difference is less than the minimum value, then the current performance data has not fallen below the threshold.

Network elements may include single-port network elements and dual-port network elements. In a single-port network element, data traffic flows through the single port. In this case, the current performance data obtained from the network element is not necessarily associated with the single port. In a dual-port (or multi-port) network element, one port typically serves as a primary port while another port serves as a standby port. If the primary port fails, then the standby port can become active. In this case, the network health monitoring module 110 may retrieve performance data associated with both ports in order to determine which port is active. Responsive to determining which port is active, the network health monitoring module 110 can then compare the performance data associated with the active port against the threshold.

If it is determined (at 206) that the current performance data does not fall below the threshold, then the network health monitoring module 110 continues to monitor the core network 104 and the access network 106 by collecting (at 202) performance data from the core network 104 and the access network 106. If it is determined (at 206) that the current performance data falls below the threshold, then the network health monitoring module 110 retrieves (at 208) troubleshooting rules from the trouble from the rule store 114 and provides the troubleshooting rules to the trouble diagnostics module 116.

Responsive to receiving the troubleshooting rules and the performance data from the rule management module 112, the trouble diagnostics module 116 performs (at 210) various actions in order to isolate and resolve (or attempt to resolve) the silent failure in accordance with the troubleshooting rules and the performance data obtained by the network health monitoring module 110. If the trouble diagnostics module 116 determines (at 212) that the silent failure is successfully resolved, then the trouble diagnostics module 116 resets (at 214) the network element where the silent failure was identified. If it is determined (at 212) that the silent failure was not successfully resolved, then the trouble diagnostics module 116 may not reset the identified network element and may inform the ticketing module 118, which generates (at 216) a trouble ticket for the silent failure.

In an illustrative implementation of a troubleshooting process in which two-way traffic has degraded into one-way traffic, the trouble diagnostics module 116 examines User-to-Network Interface ("UNI") ports on a given network element, which in this case is an Asynchronous Transfer Mode ("ATM") switch, and at the customer premises 108 through the access network 106. In particular, the trouble diagnostics module 116 examines the UNI ports of virtual paths ("VPs") or virtual channels ("VCs") associated with the network element. The trouble diagnostics module 116 may examine traffic at the port level (i.e., at the network element) as well as the endpoint level (i.e., at the customer premises 108) with respect to the UNI ports. For example, if one-way traffic is found at the port level of a given UNI port, then the silent failure may isolate the silent failure to a processor card containing the UNI port.

However, if the traffic at the port level appears to be normal but one-way traffic is found at the endpoint level, then the trouble diagnostics module 116 may examine other endpoints, if available, in order to determine whether the other endpoints are experiencing the same issue. Responsive to finding a second endpoint that is experiencing two-way traffic, the trouble diagnostics module 116 may return to the original endpoint experiencing the one-way traffic and optimize (or attempt to optimize) the original endpoint's associated path in accordance with the second endpoint's associated path. That is, the trouble diagnostics module 116 may trigger a re-route attempt. If multiple VPs or VCs experience problems, then the trouble diagnostics module 116 may examine multiple path points along the VPs or VCs in order to find common points, which may indicate the source of the silent failure.

The rule management module 112 may further perform (at 218) a root cause analysis to determine whether the silent failure is due a switchover. An illustrative implementation of the root-cause analysis involving an Automatic Protection Switching ("APS") scheme will now be described. According to exemplary embodiments, a APS scheme includes an active line and a protection line, each of which is associated with a separate APS-enabled processor card. When the active line fails, data traffic is switched from the active line to the protection line. In order to represent this transition, the APS-enabled processor card associated with the active line switches from an UP state into a DOWN state, and the APS-enabled processor card associated with the protection line switches from a DOWN state into an UP state. Even after the active line is recovered, the data traffic may remain on the protection line. In this example, the rule management module 112 may determine a switchover failure if both of the APS-enabled processor cards are in a DOWN state and neither the active line nor the protection line is handling data traffic. Responsive to performing the root cause analysis, if it is determined (at 220) that the silent failure is due to a switchover, then the rule management module informs the ticketing module 118, which generates (at 222) a trouble ticket for the silent failure. If it is determined (at 220) that the silent failure is not due to a switchover, then the method 200 ends.

Figure 3:
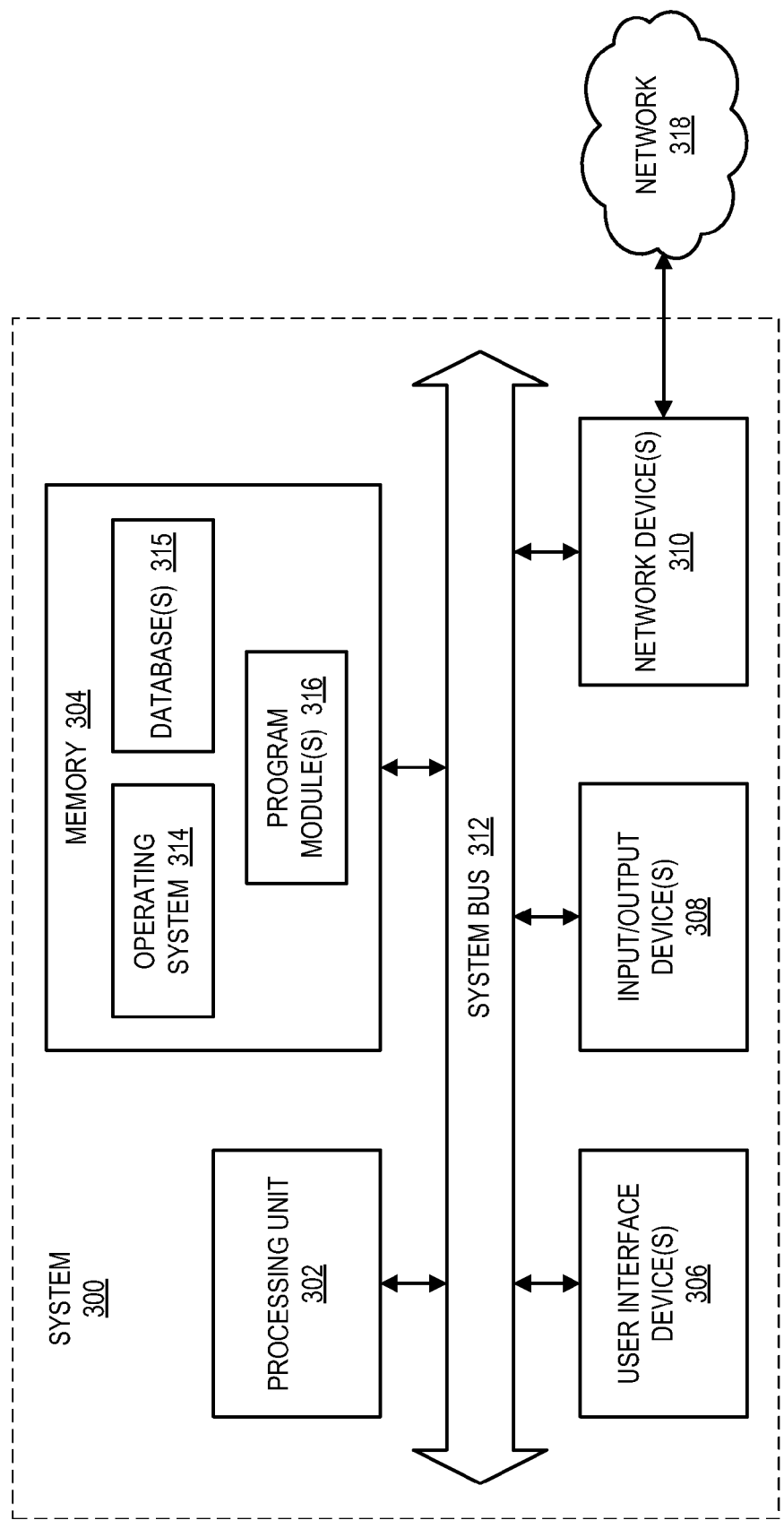
FIG. 3 is a computer architecture diagram showing aspects of an illustrative computer hardware architecture for a computing system capable of implementing aspects of the embodiments presented herein.

FIG. 3 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 3 is a block diagram illustrating a system 300 operative to identify and resolve a silent failure, in accordance with exemplary embodiments. The system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310. Examples of the system 300 include, but are not limited to, computers, servers, personal digital assistants, cellular phones, or any suitable computing devices.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 304 communicates with the processing unit 302 via the system bus 312. In one embodiment, the memory 304 is operatively connected to a memory controller (not shown) that enables communication with the processing unit 302 via the system bus 312. The memory 304 includes an operating system 314, one or more databases 315, and one or more program modules 316, according to exemplary embodiments. The program modules 316 may include the network health monitoring module 110, the rule management module 112, the trouble diagnostics module 116, and the ticketing module 118. In one embodiment, the method 200 as described above with respect to FIG. 2 is embodied as a program module in the memory 304. An example of the databases 315 is the rule store 114. Examples of operating systems, such as the operating system 314, include, but are not limited to, WINDOWS and WINDOWS MOBILE operating systems from MICROSOFT CORPORATION, MAC OS operating system from APPLE CORPORATION, LINUX operating system, SYMBIAN OS from SYMBIAN SOFTWARE LIMITED, BREW from QUALCOMM INCORPORATED, and FREEBSD operating system.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system 300.

The user interface devices 306 may include one or more devices with which a user accesses the system 300. The user interface devices 306 may include, but are not limited to, computers, servers, personal digital assistants, cellular phones, or any suitable computing devices. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the system 300 to communicate with other networks or remote systems via a network 318. In one embodiment, the network 318 is an ATM-based network. Examples of network devices 310 may include, but are not limited to, a modem, a radio frequency ("RF") or infrared ("IR") transceiver, a telephonic interface, a bridge, a router, or a network card. The network 318 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 318 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for identifying and resolving a silent failure in a telecommunications network, comprising:

collecting performance data associated with data traffic passing through a network element in the telecommunications network;

determining whether the performance data has fallen below a threshold to identify the silent failure at the network element, the silent failure failing to trigger an alarm included on the network element;

responsive to determining that the performance data is below the threshold and thereby identifying the silent failure at the network element, retrieving troubleshooting rules; and resolving the silent failure based on the performance data and the troubleshooting rules, wherein the performance data comprises a current number of packets being transmitted within a time interval, and wherein determining whether the performance data has fallen below the threshold to identify the silent failure at the network element comprises:

determining a difference between the current number of packets being transmitted within the time interval and a previous number of packets being transmitted within the time interval, the current number of packets being less than the previous number of packets, determining whether the difference is greater than a minimum value, and responsive to determining that the difference is greater than the minimum value, determining that the performance data has fallen below the threshold to identify the silent failure at the network element.

2. The method of claim 1, further comprising:
determining whether the silent failure was successfully resolved;

responsive to determining that the silent failure was successfully resolved, resetting the network element where the silent failure is resolved; and responsive to determining that the silent failure was not successfully resolved, generating a trouble ticket for the silent failure.

3. The method of claim 1, wherein the network element comprises an asynchronous transfer mode (ATM) switch.

4. The method of claim 1, further comprising:
further responsive to determining that the performance data is below the threshold and thereby identifying the silent failure at the network element, performing a root cause analysis to determine whether the silent failure is due a switchover; and
generating a trouble ticket for resolving the silent failure due to the switchover.

5. The method of claim 1, wherein collecting performance data associated with data traffic passing through a network element in the telecommunications network comprises querying the network element to retrieve the performance data from the network element.

6. The method of claim 1, wherein the performance data indicates that two-way data traffic between the network element and an endpoint has degraded into one-way data traffic.

7. A system for identifying and resolving a silent failure in a telecommunications network, comprising:
a memory for storing a program for identifying and resolving the silent failure in the telecommunications network; and
a processor functionally coupled to the memory, the processor being responsive to computer-executable instructions contained in the program and operative to:
collect performance data associated with data traffic passing through a network element in the telecommunications network,
determine whether the performance data has fallen below a threshold to identify the silent failure at the network element, the silent failure failing to trigger an alarm included on the network element,
responsive to determining that the performance data is below the threshold and thereby identifying the silent failure at the network element, retrieve troubleshooting rules, and
resolve the silent failure based on the performance data and the troubleshooting rules,
wherein the performance data comprises a current number of packets being transmitted within a time interval and wherein to determine whether the performance data has fallen below the threshold to identify the silent failure at the network element, the processor is further operative to:
determine a difference between the current number of packets being transmitted within the time interval and a previous number of being transmitted within the time interval, the current number of packets being less than the previous number of packets,
determine whether the difference is greater than a minimum value, and
responsive to determining that the difference is greater than the minimum value determine that the performance data has fallen below the threshold to identify the silent failure at the network element.

8. The system of claim 7, the processor being responsive to further computer-executable instructions contained in the program and operative to:
determine whether the silent failure was successfully resolved,
responsive to determining that the silent failure was successfully resolved, reset the network element where the silent failure is resolved, and
responsive to determining that the silent failure was not successfully resolved, generate a trouble ticket for the silent failure.

9. The system of claim 7, wherein the network element comprises an asynchronous transfer mode (ATM) switch.

10. The system of claim 7, the processor being responsive to further computer-executable instructions contained in the program and operative to:
further responsive to determining that the performance data is below the threshold and thereby identifying the silent failure at the network element, perform a root cause analysis to determine whether the silent failure is due a switchover, and
generate a trouble ticket for resolving the silent failure due to the switchover.

11. The system of claim 7, wherein to collect performance data associated with data traffic passing through a network element in the telecommunications network, the processor is further operative to query the network element to retrieve the performance data from the network element.

12. A non-transitory computer-readable storage medium having instructions stored thereon for execution by a processor to provide a method for identifying and resolving a silent failure in a telecommunications network, the method comprising:
collecting performance data associated with data traffic passing through a network element in the telecommunications network;
determining whether the performance data has fallen below a threshold to identify the silent failure at the network element, the silent failure failing to trigger an alarm included on the network element;
responsive to determining that the performance data is below the threshold and thereby identifying the silent failure at the network element, retrieving troubleshooting rules; and
resolving the silent failure based on the performance data and the troubleshooting rules,
wherein the performance data comprises a current number of packets being transmitted within a time interval, and wherein determining whether the performance data has fallen below the threshold to identify the silent failure at the network element comprises:
determining a difference between the current number of packets being transmitted within the tune interval and a previous number of packets being transmitted within the time interval, the current number of packets being less than the previous number of packets,
determining whether the difference is greater than a minimum value, and
responsive to determining that the difference is greater than the minimum value, determining that the performance data has fallen below the threshold to identify the silent failure at the network element.

13. The non-transitory computer-readable storage medium of claim 12, the method further comprising:
determining whether the silent failure was successfully resolved;
responsive to determining that the silent failure was successfully resolved, resetting the network element where the silent failure is resolved; and
responsive to determining that the silent failure was not successfully resolved, generating a trouble ticket for the silent failure.

14. The non-transitory computer-readable storage medium of claim 12, wherein the network element comprises an asynchronous transfer mode (ATM) switch.

15. The non-transitory computer-readable storage medium of claim 12, the method further comprising:
   further responsive to determining that the performance data is below the threshold and thereby identifying the silent failure at the network element, performing a root cause analysis to determine whether the silent failure is due a switchover; and
   generating a trouble ticket for resolving the silent failure due to the switchover.

16. The non-transitory computer-readable storage medium of claim 12, wherein collecting performance data associated with data traffic passing through a network element in the telecommunications network comprises querying the network element to retrieve the performance data from the network element.

17. The non-transitory computer-readable storage medium of claim 12, wherein the performance data indicates that two-way data traffic between the network element and an endpoint has degraded into one-way data traffic.

\* \* \* \* \*